Nov. 13, 1951 M. H. RHODES 2,574,497
TIMER
Filed Dec. 18, 1946 2 SHEETS—SHEET 1

Inventor
MARCUS H. RHODES
By T. Clay Lindsey
Attorney

Nov. 13, 1951     M. H. RHODES     2,574,497
TIMER
Filed Dec. 18, 1946     2 SHEETS—SHEET 2
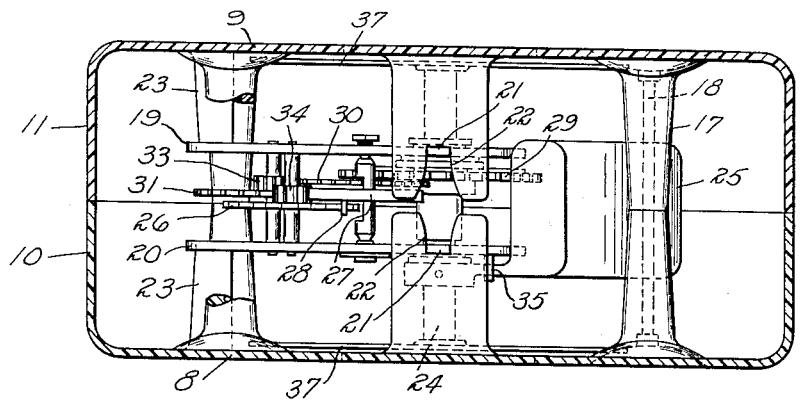
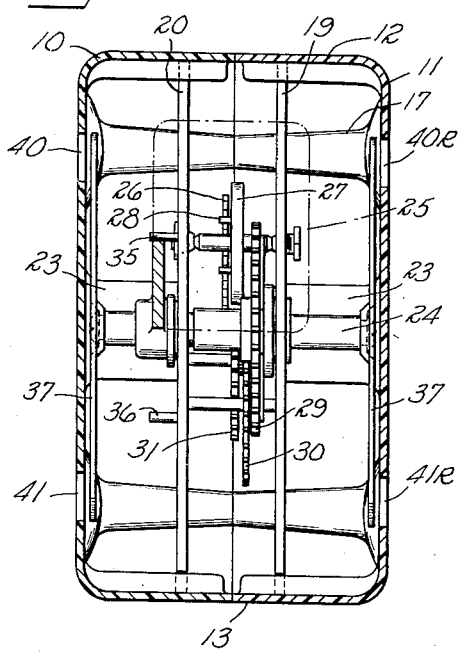
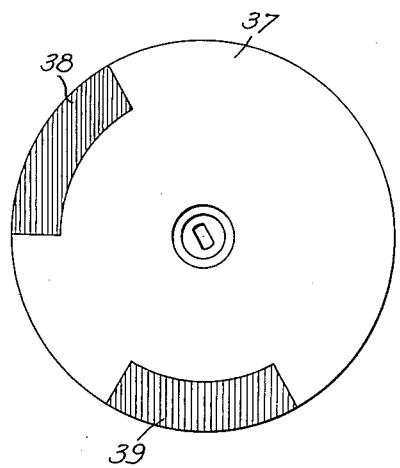
Inventor
MARCUS H. RHODES
By T. Clay Lindsey
Attorney Patented Nov. 13, 1951

2,574,497

UNITED STATES PATENT OFFICE 2,574,497

TIMER

Marcus H. Rhodes, Hartford, Conn., assignor to M. H. Rhodes Incorporated, Hartford, Conn., a corporation of Delaware Application December 18, 1946, Serial No. 717,066

11 Claims. (Cl. 161—15)

The present invention relates to timers, and more particularly to timing devices for indicating the elapsing of predetermined periods of time. The adaptation of the device for general use where a visual indication of the elapsing of a predetermined period of time is desired will be obvious, but it is desired to point out, for example, the particular usefulness of the device in connection with the timing of long distance telephone calls.

It is an object of the invention to provide a timer which will automatically indicate the elapsing of a predetermined period of time without the requirement for any winding or similar setting. More particularly, it is an object of the invention to provide a timer which will automatically indicate the elapsing of a predetermined period of time, such as, for example, three minutes when the device is to be used for timing telephone calls merely upon inversion of the device.

A further object of the invention is to provide a timer of the character described which is simple in construction and may be easily and inexpensively fabricated and assembled.

A further object of the invention is to provide a timer of the type referred to which is adapted to be quickly and conveniently inverted by either hand of the operator merely by rolling the device end-over-end upon the surface on which it rests.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the accompanying drawings;

Fig. 3 is a cross sectional view taken along the line 3—3 of Fig. 2;

Fig. 4 is a cross sectional view taken along the line 4—4 of Fig. 2; and

Fig. 5 is a view of one of the indicator disks utilized in the device.

In general, the device of the present invention comprises a casing which is adapted to be readily inverted containing a reversible weight driven time movement which is energized and set in motion when the device is inverted to measure a predetermined time interval, the device being provided with suitable indicating means preferably visible from either front or back and readily readable when the device is in original or inverted position.

Figure 1:
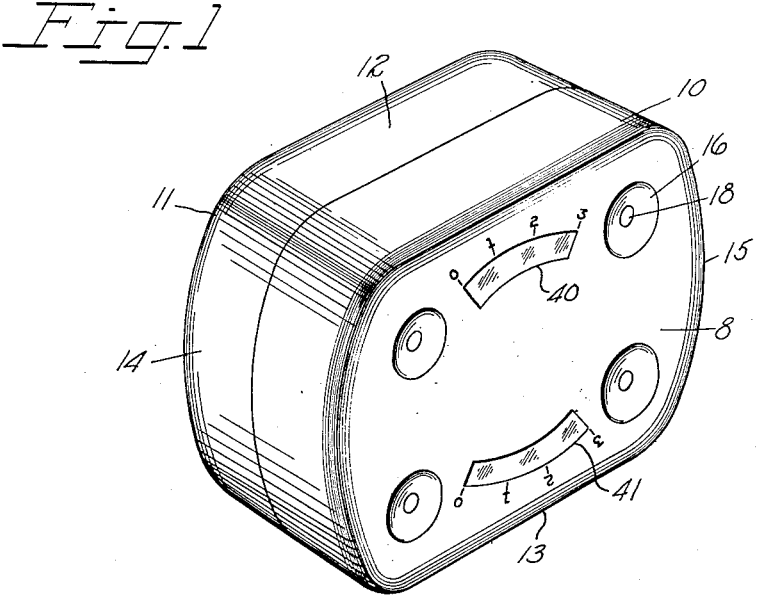
Figure 1 is a perspective view of the device.

Referring to the specific embodiment shown in the drawings, and particularly to Fig. 1, it will be seen that the device is housed in a casing formed in two closely fitting sections 10 and 11. The casing is particularly characterized by its parallel top and bottom surfaces 12 and 13, respectively, which are adapted to rest selectively upon a supporting surface. The end surfaces 14 and 15 of the casing are arcuate in shape, which facilitates inversion of the device inasmuch as the device may be easily rolled over either one of its end surfaces. To further facilitate inversion of the timer, there is provided in the front and back walls of the casing, adjacent each corner, depressions 16 whereby the device may be readily grasped between the thumb and finger of one hand and may be rolled end-over-end to its inverted position. Referring more particularly to Figs. 3 and 4, it will be seen that the casing sections 10 and 11 are formed with hollow posts 17 which abut against each other and the casing is held together by means of rivets 18 extending therethrough.

Figure 2:
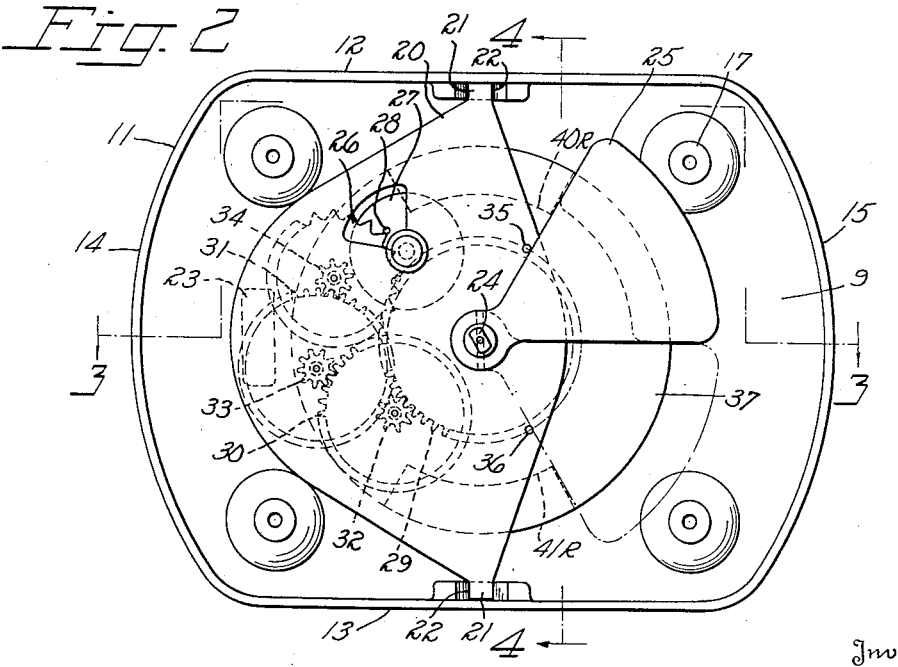
Fig. 2 is a vertical, longitudinal view of the device with half of the casing removed.

Housed within the casing sections 10 and 11 is a time movement which is mounted on a pair of spaced plates 19 and 20, each of which is provided with a three-point support in the adjacent casing sections 10 and 11. Referring particularly to Fig. 2, it will be seen that the plates 19 and 20 are provided with oppositely positioned extensions or ears 21 which are received in slotted shoulders 22 formed on the top and bottom surfaces of the casing section. The other points of support for the plates 19 and 20 are provided by brackets 23 extending inwardly from the faces 8 and 9 of the casing sections 10 and 11 respectively.

The time movement comprises an arbor 24 journaled in the spaced plates 19 and 20 and the ends of the arbor extend to closely adjacent the faces 8 and 9 of the casing sections 10 and 11. The arbor is driven by a weight 25 which is fixed thereto. The speed at which the arbor is driven by the weight is controlled by an escapement mechanism through a gear train. The escapement mechanism comprises an escapement wheel 26 and a pallet wheel 27 having pins 28 which cooperate with the teeth of the escapement wheel. It will be seen that the escapement mechanism is such as to permit the time mechanism to be driven in either direction. The gear train comprises the gears 29, 30 and 31 and the pinions 32, 33 and 34 respectively meshing therewith. The gear 29 is fixed to the arbor 24 and the pinion 34 is fixed to the escapement wheel 26. The arc through which the weight 25 may move due to the force of gravity is limited by a pair of spaced stops or pins 35 and 36 projecting forwardly from the plate 19.

Secured to either end of the arbor 24 so as to turn therewith are indicating disks 37 or dials shown more particularly in Fig. 5 of the drawings. The indicating disks 37 are provided with areas 38 and 39 of contrasting color which are adapted to cooperate with the arcuate windows 40 and 41 provided in the face 8 of the casing sections 10 and arcuate windows 40R and 41R in the face 9 of casing section 11. The areas 38 and 39 are so spaced that as the disk 37 is turned by the time movement, one of the areas gradually moves across the upper window while the other area initially extending across the lower window is gradually withdrawn. When the device is inverted, the operation is repeated in the reverse direction. Referring particularly to Fig. 1, it will be seen that each of the windows is provided with indicia in the form of spaced numerals to be read when that window is in the upper position for measuring the elapsed period of time. In the specific embodiment shown in the drawings, the timer is one which is intended for use in timing long distance telephone calls and, therefore, is constructed to run for three minutes after each inversion. The elapse of time is indicated by the extent of the movement of the colored areas 38 or 39 across the windows as shown by the spaced numerals and when the window is completely covered, the full three minutes has elapsed.

The operation of the device will be readily understood from the foregoing description taken in connection with the following explanation: Assuming that the device has just been inverted to the position shown in Fig. 2, the weight 25 is found to be in its uppermost position and will proceed to move from the full line position shown in Fig. 2 to the dotted line position shown in the figure, at which point it will be stopped by the pin 36. During the movement of the weight 25 from the full line position to the dotted line position, the time mechanism is driven thereby causing the disks 37 to turn thereby bringing the colored areas 38 across the windows 40 and 40R from "0" to "3" as the time elapses, and in the final position these windows are entirely covered. Simultaneously, the colored areas 39 are withdrawn from behind the lower windows 41 and 41R. If it is then desired to time another three minute period, it is only necessary to invert the device, thereby bringing the lower window to the upper position, the weight being then in the upper full line position of Fig. 2, after the device is inverted there is caused a repetition of the action previously described in the reverse direction.

If, at any time, it is desired to halt the operation of the device as, for example, when the telephone connection is interrupted, etc., it is only necessary to turn the device over on one of its faces, which will temporarily stop the timing mechanism and, when the device is then returned to its original position, the timing of the interval then proceeds as above.

Inasmuch as all of the moving parts of the device are positioned within the casing, it will be appreciated that the device is not readily susceptible to damage and can be readily made substantially dust and moisture proof. As a result, the device is characterized by its durability and dependable action over long periods of time without requirement for frequent repair or replacement of parts. The device can be made inexpensively and with a minimum of parts and can be readily assembled merely by inserting the time movement into its proper position with respect to one of the casing sections, whereupon the remaining casing section can be placed thereover and the entire assembly locked in position by the rivets 18.

The simplicity of the inverting procedure has been referred to previously and it will be appreciated that because of the arcuate end surfaces 14 and 15 and the depressions 16 the operator can easily invert the device by grasping the case with either hand at one of the lower corners by placing a thumb and finger in the depressions 16 whereupon the device can be rolled end-over-end to the inverted position.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statement of the scope of the invention which, as a matter of language, might be said to fall therebetween.

I claim as my invention:

1. A timing device comprising a casing having top and bottom walls adapted to selectively rest upon a supporting surface, a time movement within the casing having a movable indicator and an escapement for controlling the speed of movement thereof, and driving means for the indicator energized by inversion of the device.

2. A timing device comprising a casing having parallel top and bottom walls adapted to selectively rest upon a flat supporting surface and arcuate side walls about which the casing may be rolled on the surface when it is desired to invert the device, and a time movement within the casing having a movable indicator and an escapement for controlling the speed of movement thereof, and driving means for the indicator energized by inversion of the device.

3. A timing device comprising a casing having parallel top and bottom walls adapted to selectively rest upon a flat supporting surface, front and rear walls, and outwardly curved end walls about which the casing may be rolled when it is desired to invert the device, said casing having in its front and rear walls adjacent each corner of the casing aligned thumb and finger holds for facilitating inversion of the casing, and a time movement within the casing having driving means rendered effective by inversion of the device.

4. A timing device comprising a casing having top and bottom walls adapted to selectively rest upon a supporting surface, and a time movement within the casing arranged to be driven in opposite directions, said time movement having a driving weight which is rendered effective by inverting the device, an indicator driven by said movement, and an escapement for controlling the speed of movement of said indicator.

5. A timing device comprising a casing having top and bottom walls adapted to selectively rest upon a supporting surface, and a time movement within the casing arranged to be driven in opposite directions, said time movement having a driving weight pivotally mounted for limited gravitational movement when the device is inverted, an indicator driven by said movement, and an escapement for controlling the speed of movement of said indicator.

6. A timing device comprising an invertible casing having top and bottom walls adapted to selectively rest upon a supporting surface, a time movement within the casing having driving means rendered effective for limited operation by inversion of the device and including an arbor driven in opposite directions by said movement depending upon the position of said casing, and indicating means connected to said arbor for indicating the operation of the time movement.

7. A timing device comprising an invertible casing having a face and top and bottom walls adapted to selectively rest upon a supporting surface, a time movement within the casing having an arbor rotatable in opposite directions depending upon the position of the casing, a gravity weight mounted for limited driving of said arbor in one direction in one position of the casing and in the opposite direction when the casing is inverted, windows in said face above and below the center thereof, and an indicating member on the arbor viewable through said windows.

8. A timing device comprising an invertible casing having top and bottom walls adapted to selectively rest upon a supporting surface, a time movement within the casing having an arbor rotatable in opposite directions, a gravity weight for driving said arbor mounted for limited movement in one direction in one position of the casing and in the opposite direction when the casing is inverted, means for controlling the speed of rotation of the arbor, a pair of spaced arcuate windows in one face of the casing respectively above and below the arbor, and an indicating disk on the arbor having areas of contrasting color for registering with said windows for indicating the operation of the time movement.

9. A timing device comprising an invertible casing having top and bottom walls adapted to selectively rest upon a supporting surface, a time movement within the casing comprising a rotatable arbor, a weight connected to said arbor for driving the same in either direction depending upon the position of the casing, stops limiting movement of said weight in either direction, and an escapement mechanism for controlling the speed of rotation of said arbor in either direction, and an indicator on the arbor for indicating the operation of said time movement.

10. A timing device comprising an invertible casing, a time movement therein having a horizontally disposed arbor, an escapement for controlling the speed of rotation thereof in either direction, a gravity weight connected to said arbor for downward movement to drive the arbor in one direction when the device is in one position and in the opposite direction when the device is inverted, stops for limiting movement of said weight, and indicating means for indicating movement of the arbor.

11. A timing device comprising an invertible casing, a pivotally mounted weight in the casing adapted to move downwardly in one direction in one position of the casing and downwardly in the opposite direction when the casing is inverted, stops for limiting movement of said weight, a time movement driven at a controlled speed by downward movement of said weight in either direction, and an indicator for indicating the operation of the time movement.

MARCUS H. RHODES.

REFERENCES CITED

The following references are of record in the file of this patent:

UNITED STATES PATENTS

| Number | Name | Date |
|---|---|---|
| 346,880 | Whittmann | Aug. 3, 1886 |
| 1,002,227 | Corson | Sept. 5, 1911 |
| 2,161,046 | Hitzeman | June 6, 1939 |
| 2,269,021 | Hazard | Jan. 6, 1942 |
| 2,431,395 | Godley | Nov. 25, 1947 |

FOREIGN PATENTS

| Number | Country | Date |
|---|---|---|
| 15,574 | Great Britain | Oct. 30, 1888 |
| 17,741 | Great Britain | Sept. 23, 1895 |